US009761023B1

(12) United States Patent
Koehler et al.

(10) Patent No.: US 9,761,023 B1
(45) Date of Patent: Sep. 12, 2017

(54) DEVICE AND METHOD FOR ITERATIVE RECONSTRUCTION OF IMAGES RECORDED BY AT LEAST TWO IMAGING METHODS

(71) Applicant: KONINKLIJKE PHILIPS N.V., Eindhoven (NL)

(72) Inventors: Thomas Koehler, Norderstedt (DE); Frank Bergner, Hamburg (DE); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/917,615

(22) PCT Filed: Jul. 29, 2015

(86) PCT No.: PCT/EP2015/067363
§ 371 (c)(1),
(2) Date: Mar. 9, 2016

(87) PCT Pub. No.: WO2016/023751
PCT Pub. Date: Feb. 18, 2016

(30) Foreign Application Priority Data

Aug. 15, 2014 (EP) ..................................... 14181164

(51) Int. Cl.
*G06T 11/00* (2006.01)
(52) U.S. Cl.
CPC ....... *G06T 11/006* (2013.01); *G06T 2211/408* (2013.01); *G06T 2211/424* (2013.01)
(58) Field of Classification Search
CPC ............. G06T 11/006; G06T 2211/424; G06T 11/003; G06T 2211/408; G06T 2207/10081
See application file for complete search history.

(56) References Cited

U.S. PATENT DOCUMENTS

| 2006/0215891 | A1* | 9/2006 | Fessler | .................. | G06T 11/005 |
| | | | | | 382/128 |
| 2013/0181711 | A1* | 7/2013 | Chaari | ............... | G01R 33/5611 |
| | | | | | 324/309 |

(Continued)

FOREIGN PATENT DOCUMENTS

| CN | 103082997 | 5/2013 |
| WO | 2014047518 | 3/2014 |

OTHER PUBLICATIONS

Yang Lu, et al., "Few-view image reconstruction with dual dictionaries", Physics in Medicine and Biology, vol. 57, No. 1, Dec. 7, 2011.

(Continued)

*Primary Examiner* — Edward Park

(57) ABSTRACT

The present invention relates to a device (100) for iterative reconstruction of images recorded by at least two imaging methods, the device comprising: an extraction module (10), which is configured to extract a first set of patches from a first image recorded by a first imaging method and to extract a second set of patches from a second image recorded by a second imaging method; a generation module (20), which is configured to generate a set of reference patches based on a merging of a first limited number of atoms for the first set of patches and of a second limited number of atoms for the second set of patches; and a regularization module (30), which is configured to perform a regularization of the first image or the second image by means of the generated set of reference patches.

15 Claims, 4 Drawing Sheets

(56) References Cited

U.S. PATENT DOCUMENTS

| | | | |
|---|---|---|---|
| 2013/0202168 A1 | 8/2013 | Jerebko | |
| 2013/0343624 A1 | 12/2013 | Thibault | |
| 2014/0119628 A1 | 5/2014 | Elad | |
| 2014/0285194 A1* | 9/2014 | Hutter | G01R 33/56 324/309 |
| 2015/0125061 A1* | 5/2015 | Holt | G06T 5/001 382/132 |
| 2015/0363947 A1* | 12/2015 | Rigie | G06T 11/005 382/131 |
| 2016/0025833 A1* | 1/2016 | Polimeni | G01R 33/5611 324/309 |

OTHER PUBLICATIONS

Zhao, et al., "Dual-dictionary learning-based iterative image reconstruction for spectral computed tomography application", Physics in Medicine and Biology, vol. 57, No. 24, Nov. 29, 2012.

Xu, et al., "Low-Dose X-ray CT Reconstruction via Dictionary Learning", Medical Imaging, IEEE Transactions, vol. 31, Issue 9, Sep. 2012.

* cited by examiner

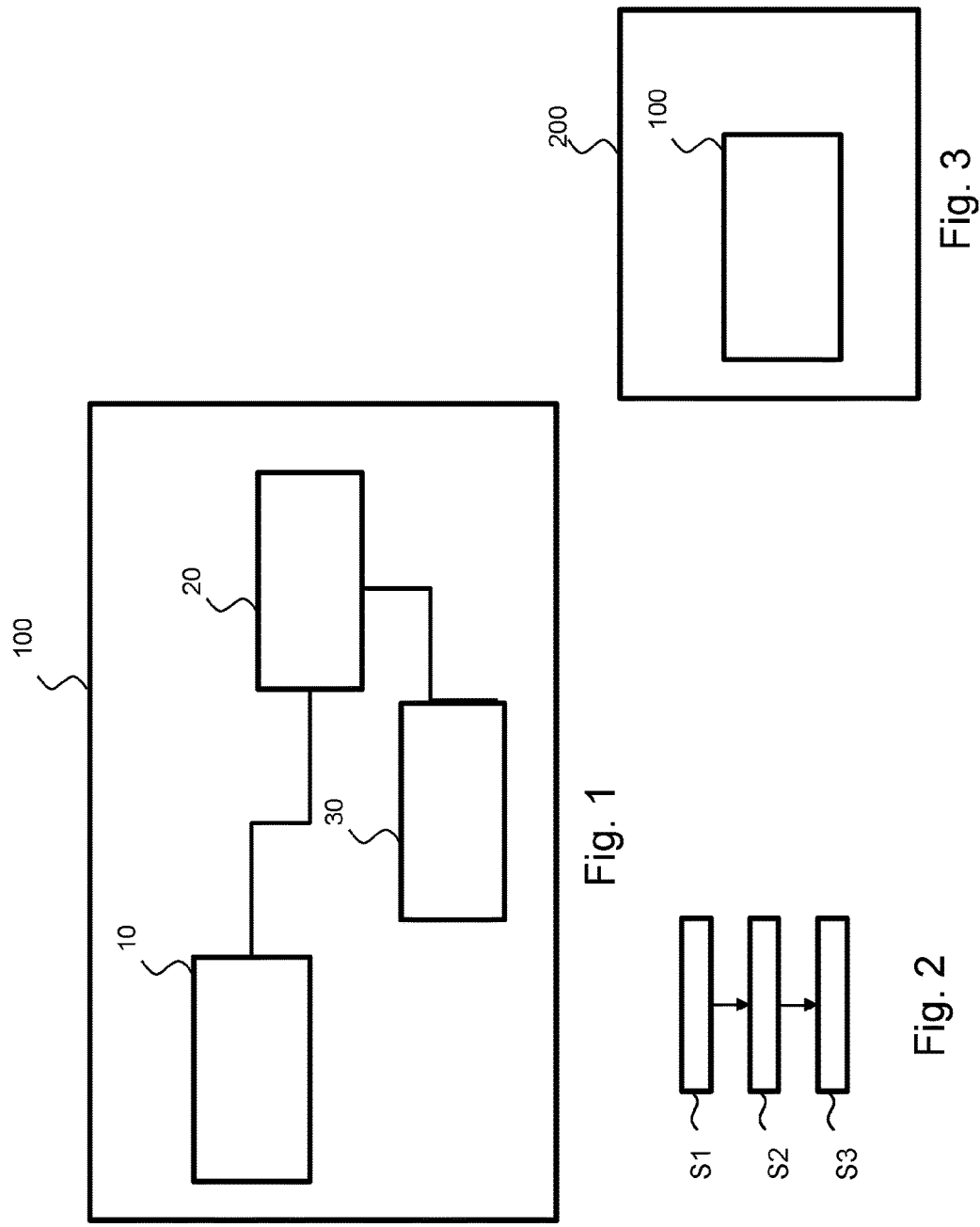

DEVICE AND METHOD FOR ITERATIVE RECONSTRUCTION OF IMAGES RECORDED BY AT LEAST TWO IMAGING METHODS

CROSS REFERENCE TO RELATED APPLICATIONS

This application is the U.S. National Phase application under 35 U.S.C. §371 of International Application No. PCT/EP2014/067363, filed Jul. 29, 2015, published as WO 2016/023751 on Feb. 18, 2016, which claims the benefit of European Patent Application Number 14181164.6 filed Aug. 15, 2014. These applications are hereby incorporated by reference herein.

FIELD OF THE INVENTION

The present invention relates to the field of dictionary based iterative image reconstruction. Particularly, the present invention relates to a device and a method for iterative reconstruction of images recorded by at least two imaging methods.

BACKGROUND OF THE INVENTION

For supervised image segmentation, and also for image modeling, iterative image reconstruction is a method used to reconstruct two-dimensional and three-dimensional images in certain imaging techniques. For example, in computed tomography an image may be reconstructed from projections of an object. A common feature of dual energy X-ray computed tomography, spectral X-ray computed tomography, and phase-contrast computed tomography is that the medical imaging system generates two or even more images of an object with different contrasts with sufficient geometric alignment.

SUMMARY OF THE INVENTION

There may be a need to improve devices and methods for iterative image reconstruction.

These needs are met by the subject-matter of the independent claims. Further exemplary embodiments are evident from the dependent claims and the following description.

An aspect of the present invention relates to a device for iterative reconstruction of images recorded by at least two imaging methods, the device comprising: an extraction module, which is configured to extract a first set of patches from a first image recorded by a first imaging method and to extract a second set of patches from a second image recorded by a second imaging method; a generation module, which is configured to generate a set of reference patches based on a merging of a first limited number of atoms for the first set of patches and of a second limited number of atoms for the second set of patches; and a regularization module, which is configured to perform a regularization of the first image or the second image by means of the generated set of reference patches.

The term "patch" as used by the present invention relates to a subset of pixels of an intra-image area. A patch may comprise a rectangular shape and may comprise an array of pixels.

The term "atom" as used by the present invention may refer to a representative pattern occurring in a recorded image. A multitude of atoms may be stored in a so-called dictionary.

In other words, the "merging" or combining of atoms allows building patches that have a high similarity to the image patches but without noise or with reduced noise. The term "reference patches" might be understood as a name for the synthesized patches. In the reconstruction the reference patch may be used for the regularization: In the cost function, the reference patch can be 'mixed' into the final image. If the image comprises a noise level about a certain threshold, more portions are used from the reference patches. The operational term "merging" includes, but is not limited to, forming of linear combinations and or scaling operations and similar.

The term "limited number" or "limited number of atoms" as used by the present invention may refer to a number of atoms which is considered to be suitable and sufficient of a certain task of image analysis or image processing or image reconstruction. In particular, "limited number" includes the borderline case for a single atom and "merging" is to be construe broadly to include using said single atom.

The term "at least two imaging methods" may refer to any two imaging methods or imaging techniques, which may be defined as representing complementary or supplementary methods or imaging techniques with respect to each other. For instance, an attenuation image and a phase image for the case of phase-contrast imaging or a photo-electric image and a Compton-scatter image for the case of dual energy imaging may be referred to as complementary or supplementary methods. The phase image may be regarded as a complementary or supplementary image with respect to the attenuation image and correspondingly the methods and techniques used to capture these images are also referred to as complementary or supplementary. In yet other words, contrast in the two images (obtained from the two different imaging methods) stems from different physical effects or principles.

A further, second aspect of the present invention relates to a medical imaging system comprising a device according to the first aspect or according to any implementation form of the first aspect.

A further, third aspect of the present invention relates to a method for iterative reconstruction of images recorded by at least two imaging methods, the method comprising the steps of: Extracting a first set of patches from a first image recorded by a first imaging method and extracting a second set of patches from a second image recorded by a second imaging method by means of an extraction module; Generating a set of reference patches based on a merging of a first limited number of atoms for the first set of patches and of a second limited number of atoms for the second set of patches by means of a generation module; and Performing a regularization of the first image or the second image using the generated set of reference patches by means of a regularization module.

The present invention advantageously provides a method for extracting patches from the images, matching the patches using a linear combination of a limited number of atoms which yields a reference patch. For example: minimize the squared error between a patch and the linear combination of only two atoms. The cost function proposed may prefer that the same atoms are selected in both e.g. the photo and scatter image. This will prefer images with similar structures but maybe different scaling. The calculated reference patches may be assumed to have a high similarity to the original patches but are almost noiseless or at least noise-reduced. The reference patches may be used for regularizing the image reconstruction: If the reconstruction is too noisy a reducing of the difference between the patches in the iterated image and the reference patches is performed.

The present invention advantageously performs a regularization of the first image or the second image by means of the generated set of reference patches, in other words, since the generated set of reference patches is generated by merging a first limited number of atoms from the first image and a second limited number of atoms from the second images, similar atoms are used for both images, which means that at least partially an overlapping of the set of atoms may occur.

The term "similar" as used by the present invention may refer to two geometrical objects if they both have the same shape, or one has the same shape as the mirror image or an otherwise transformed image of the other. The term "similar" may further define that one object can be obtained from the other object by uniformly scaling, for instance enlarging or shrinking, possibly with additional translation, rotation and reflection.

The present invention advantageously provides uses a database or a dictionary that been already created or is at least generated elsewhere.

The present invention advantageously provides a dictionary based regularization method in the iterative reconstruction algorithm for computed tomography configurations that generate two or more images with the same alignment.

The present invention advantageously provides a standard dictionary based regularization for typical computer tomography images, often similar structures and textures appear. A set of small features is generated from a computer tomography image, for instance patches of a certain size. The features may be called atoms and the set of all atoms may be called the dictionary. The atoms may be computed in a way that a linear combination with a limited number of atoms forms a good approximation of most patches of the image. In order to use the dictionary in the regularization, the image may be partitioned into overlapping patches of the same size as the atoms and the algorithm seeks for an image where each of the patches may be reasonably well represented by a small number of atoms.

The present invention advantageously provides an adapting algorithm, wherein patches are extracted from each of the two images recorded by the two complementary or supplementary imaging methods, for instance, an attenuation image and a phase image for the case of phase-contrast imaging or a photo-electric image and a Compton-scatter image for the case of dual energy imaging. The present invention advantageously allows representing these two patches by the same subset of atoms.

The present invention advantageously allows that an atom that may be used for one of the at least two recorded images can also be used without additional effort for the other image recorded by the second imaging method. The present invention advantageously allows reconstructing images which have their edges lined up since these edges are represented by the same atoms.

The present invention advantageously can be applied to dual energy X-ray computed tomography with a dual source system or with a fast kVp switching acquisition for two voltages. Decomposition may be performed in the image domain, accordingly the two imaging methods may be defined by X-ray computed tomography with—at least two—different input X-ray spectra.

Supplementary or complementary images or methods for the present invention may also be given by the upper and lower layer images as acquired by a dual layer system.

According to an exemplary embodiment of the present invention, the extraction module is configured to extract the first set of patches from an attenuation image recorded as the first image and to extract the second set of patches from a phase image recorded as the second image. This advantageously allows an efficient generation of various patches.

According to an exemplary embodiment of the present invention, the extraction module is configured to extract the first set of patches from a photo-electric image recorded as the first image and to extract the second set of patches from a Compton-scatter image recorded as the second image.

This advantageously allows an efficient extraction of patches from complementary or supplementary images.

According to an exemplary embodiment of the present invention, the generation module is configured to generate the set of the reference patches based on a linear combination of the first set of patches and the second set of patches.

According to an exemplary embodiment of the present invention, the generation module is configured to generate the set of reference patches based on an affine combination, a conical combination, or a convex combination of atoms for the first set of patches and a combination of atoms for second set of patches.

According to an exemplary embodiment of the present invention, the extraction module is configured to extract as the first set of patches 2×2 pixel patches or 4×4 pixel patches or 8×8 pixel patches or 16×16 pixel patches and to extract as the second set of patches 2×2 pixel patches or 4×4 pixel patches or 8×8 pixel patches or 16×16 pixel patches.

According to an exemplary embodiment of the present invention, the generation module is configured to generate the set of reference patches in form of a generic dictionary.

According to an exemplary embodiment of the present invention, the generation module is configured to generate the generic dictionary comprising base functions of two-dimensional discrete transformations.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) or an EPROM (Erasable Programmable Read Only Memory). A computer-readable medium may also be a data communication network, for example the Internet, which allows downloading a program code.

The methods, systems, and devices described herein may be implemented as software in a Digital Signal Processor, DSP, in a micro-controller or in any other side-processor or as a hardware circuit within an application specific integrated circuit, ASIC, CPLD or FPGA.

The present invention can be implemented in digital electronic circuitry or in computer hardware, firmware, software, or in combinations thereof, for instance in available hardware of conventional medical imaging devices or in new hardware dedicated for processing the methods described herein.

A more complete appreciation of the invention and the attendant advantages thereof will be clearly understood by reference to the following schematic drawings, which are not to scale, wherein:

FIG. 1 shows a schematic diagram of a device for iterative reconstruction of images recorded by at least two imaging methods according to an exemplary embodiment of the present invention;

FIG. 2 shows a schematic diagram of a flow-chart diagram for a method for iterative reconstruction of images recorded by at least two imaging methods;

FIG. 3 shows a schematic diagram of a medical imaging system comprising a device for iterative reconstruction of images recorded by at least two imaging methods according to an exemplary embodiment of the present invention;

DETAILED DESCRIPTION OF EMBODIMENTS

Figure 5:
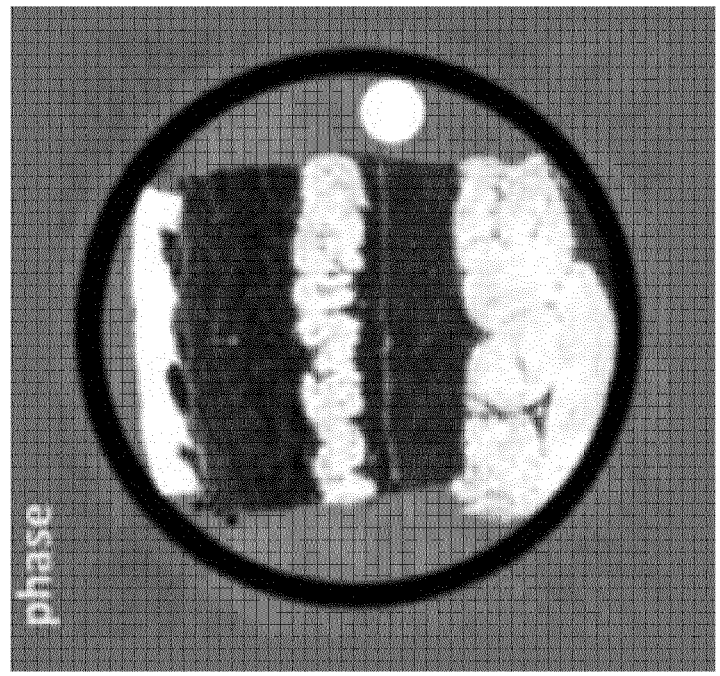
FIG. 5 shows a phase image recorded by phase-contrast imaging for explaining the present invention.

The illustration in the drawings is purely schematic and does not intend to provide scaling relations or size information. In different drawings, similar or identical elements are provided with the same reference numerals. Generally, identical parts, units, entities or steps are provided with the same reference symbols in the description.

Figure 7:
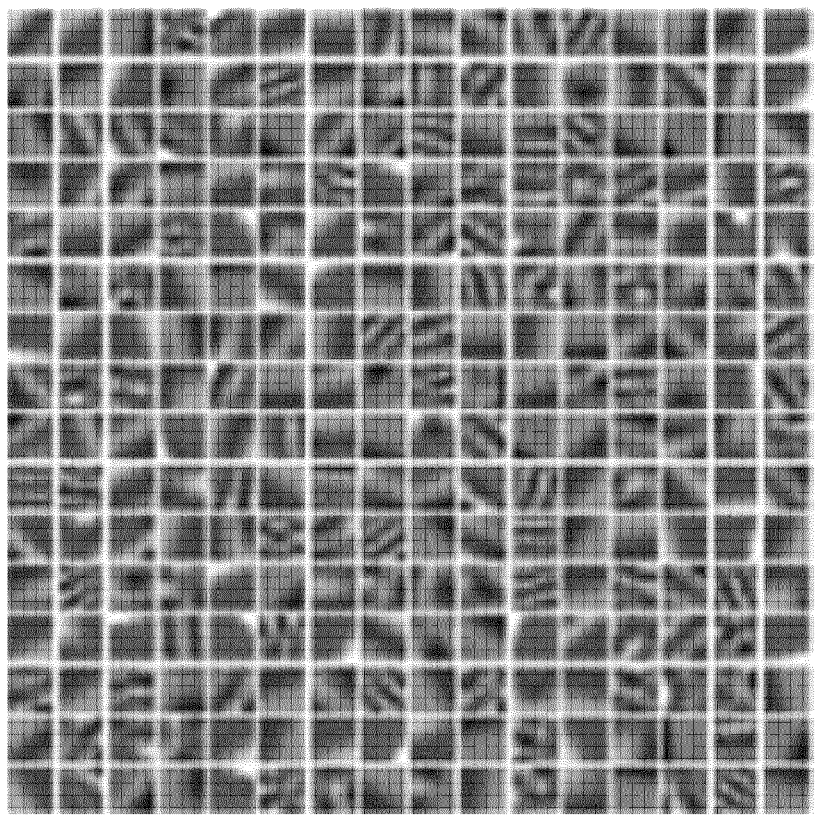
FIG. 7 illustrates a dictionary used for dictionary-based reconstruction.
Figure 6:
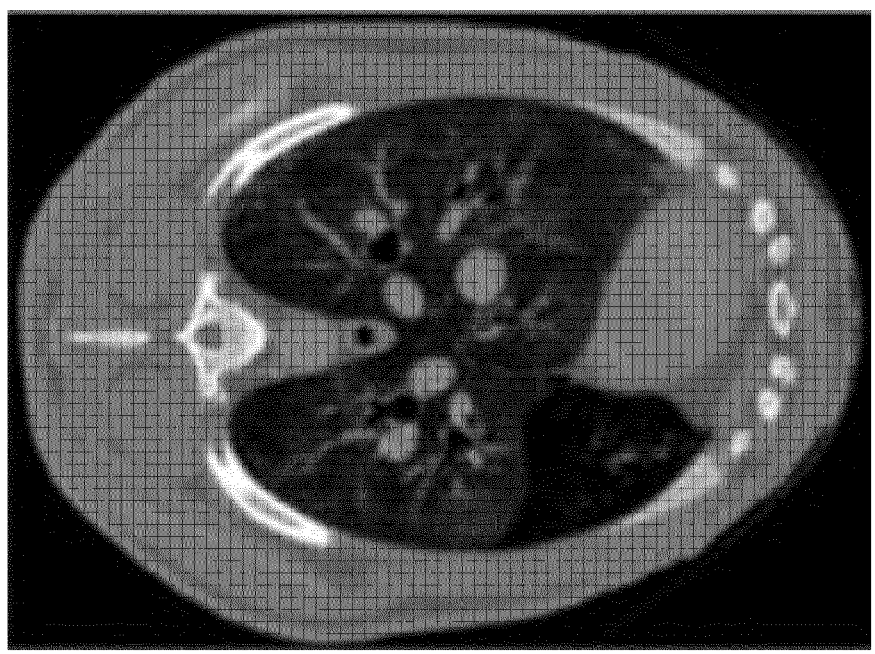
FIG. 6 shows an X-ray transmission image.

Before turning to the reconstruction device and related method as proposed herein, some principles of dictionary-based regularization for iterative reconstruction are explained in the following. An iterative reconstruction may be formulated as a minimization problem:

$$\min_{\mu,\alpha} \sum_i \frac{w_i}{2}([A\mu]_i - l_i)^2 + \lambda\left(\sum_s (\|E_s\mu - D\alpha_s\|_2^2 + v_s\|\alpha_s\|_0)\right)$$

where the first part is the commonly used data term with A being the system matrix, μ an unknown image, $l_i$ measured line integrals and $w_i$ some statistical weights. The second part, the regularization part (weighted with a regularization parameter λ) contains a sum over all "patches", that is, image parts. The regularization part represents a "penalty" incurred for each image during the course of the itertation. A contribution of each patch s to the penalty may contain two terms, the first one may be the quadratic misfit of a local patch (extracted from an image μ by the so-called extractor matrix $E_s$) and a best-fitting linear combination of "atoms" (with $\alpha_s$ being the coefficient-vector). The second term may be the 0-norm of the vector $\alpha_s$ of coefficients, meaning that there is a preference by the algorithm to represent each patch by a minimum number of atoms. The very last term in the regularization term can also be formulated in the form of a constraint which is preferred for some optimization algorithms. This cost function may be complex to minimize directly, also because the involved 0-norm implies that convexity of the cost function is not guaranteed. Therefore, the cost function is typically minimized by minimizing in an alternating manner the data term and the regularization term. The data term is purely quadratic and optimized. FIG. 6 shows an X-ray transmission image for illustration. More specifically, FIG. 6 shows an example of a sheep lung computed tomography image and a set of small features, the patches that is, which are in this case patches of size 8×8. The features are called atoms (briefly referred to above) and the set of all atoms is called a dictionary. The atoms were computed in this example in a way that a linear combination forms a "good" approximation of most 8×8 patches of the image. Note that this dictionary may also be a generic dictionary, for example a dictionary consisting of the base functions of a two-dimensional discrete cosine transformation. FIG. 7 illustrates a set of atoms. In order to use the dictionary in the regularization, the image is partitioned into overlapping patches of the same size as the atoms and the algorithm seeks for an image where each of the patches can be reasonably well represented by a small number of atoms.

Turning now to the device as proposed herein, FIG. 1 shows a schematic diagram of a device for iterative reconstruction of images recorded by at least two imaging methods.

The device 100 for iterative reconstruction of images may comprise an extraction module 10, a generation module 20, and a regularization module 30.

The extraction module 10 may be configured to extract a first set of patches from a first image recorded by a first imaging method and to extract a second set of patches from a second image recorded by a second imaging method.

The generation module 20 may be configured to generate a set of reference patches based on a merging of a first limited number of atoms for the first set of patches and of a second limited number of atoms for the second set of patches.

The generation of the set of reference patches may be performed in a way that the reference patch matches the extracted patches in a sufficient manner as may be defined by a matching threshold.

The regularization module 30 may be configured to perform a joint regularization of the first image and the second image by means of the generated set of reference patches.

According to an embodiment of the present invention an algorithm is adapted in the following way: Patches are extracted from each of the two images recorded by at least two methods, the methods being complementary or supplementary with respect to each other. For instance, an attenuation image and a phase image is recorded for phase contrast imaging or a photo-electric image and a Compton-scatter image is recorded for dual energy imaging.

Further these two patches which represent the same anatomy are used to generate a common subset of atoms. This may be formulated by (taking differential phase contrast imaging as an example)

$$\min_{\mu,\alpha} \sum_i \frac{w_i}{2}([A\mu]_i - l_i)^2 + \sum_i \frac{w_i'}{2}([A'\delta]_i - l_i')^2 + \lambda\left(\sum_s (\|E_s\mu - D\alpha_s\|_2^2 + \|E_s\delta - D\alpha_s'\|_2^2 + v_s\|\,|\alpha_s| + |\alpha_s'|\,\|_0)\right)$$

where we introduced another data term containing the real part of the refractive index δ, the differential forward operator A', and the differential phase line integrals $l'_i$. Furthermore, the regularization term contains additionally the quadratic misfit of the patches taken from the image δ and the attenuation image μ, the best-fitting linear combination of atoms with $\alpha'_s$ and $\alpha_s$ being the respective coefficient-vectors for the phase and attenuation "channel".

Both images may be treated completely independently. However, the enforcement of matching geometry (but not, or not necessarily, of contrast/scale) is done jointly for the two imaging channels. In this embodiment, said enforcement is implemented by by the very last term of above cost function, where the absolute values of the two vectors of coefficients are first added component-wise before the 0-norm is taken. By this design, any atom that is used for one of the images can be used without additional "cost" by the other image. Consequently, the algorithm will prefer reconstructed images which have their edges lined up since these edges are represented by the same atoms.

FIG. 2 shows a schematic flow-chart diagram of a method for iterative reconstruction of images recorded by at least two imaging methods. The method may comprise the following steps.

As a first step of the method, extracting S1 a first set of patches from a first image recorded by a first imaging method and extracting a second set of patches from a second image recorded by a second imaging method by means of an extraction module 10 may be performed.

As a second step of the method, generating S2 a set of reference patches based on a merging of a first limited number of atoms for the first set of patches and of a second limited number of atoms for the second set of patches by means of a generation module 20 may be performed.

As a third step of the method, performing S3 a regularization of the first image or the second image using the generated set of reference patches by means of a regularization module 30 may be performed.

According to a further embodiment of the present invention, a dual layer X-ray computed tomography system may provide additionally a high-quality so-called combined image that is equivalent to a preexisting computed tomography image. The reconstructed combined image may be also used as the source for the dictionary. Specifically, the method comprises the steps: generating a high-quality combined image $\mu$, reconstructing the photo-electric image $x_p$ and the Compton or Compton-scatter image $x_C$ by minimizing:

$$\min_{x_p, x_C, \alpha_p, \alpha_C} \sum_i \frac{w_{p,i}}{2}([Ax_p]_i - l_{p,i})^2 + \sum_i \frac{w_{C,i}}{2}([Ax_C]_i - l_{C,i})^2 +$$
$$\lambda \left( \sum_s \|E_s x_p - \alpha_{p,s} E_s \mu\|_2^2 + \|E_s x_C - \alpha_{C,s} E_s \mu\|_2^2 \right)$$

A current patch from the combined image u may be extracted and used as a single atom for the respective patch in $x_p$, $x_C$ and this single atom is scaled for each patch individually for the photo-electric image and the Compton image with the best-fitting scalar factor $\alpha_{p,s}$ and $\alpha_{C,s}$.

The advantages of the embodiment are that no global dictionary is involved anymore which also avoids the time consuming and high parametric generation of this dictionary, the complex and time consuming search for the best fitting subset of atoms is replaced by a single atom that is known upfront, and the used atom from the combined image is known to represent the local structure of the patient accurately.

The described formula as noted above contains two independent data terms, i.e., the joint regularization is combined here with the concept of "single channel spectral MLIR". Of course, the data term may also contain as an additional term the correlation between the photo-electric and the Compton line integrals, which results in the so-called "multi-channel spectral MLIR". Furthermore, the data term may operate directly on the data of the upper and lower layer, resulting in the so-called "fully spectral MLIR".

FIG. 3 shows a schematic diagram of a medical imaging system comprising a device for iterative reconstruction of images recorded by at least two imaging methods according to an exemplary embodiment of the present invention.

A medical imaging system 200 may comprise a device 100 for iterative reconstruction of images recorded by at least two imaging methods. The medical imaging system 200 may be a dual energy X-ray computed tomography system with a dual source system or with a fast kVp switching acquisition for two voltages.

Figure 4:
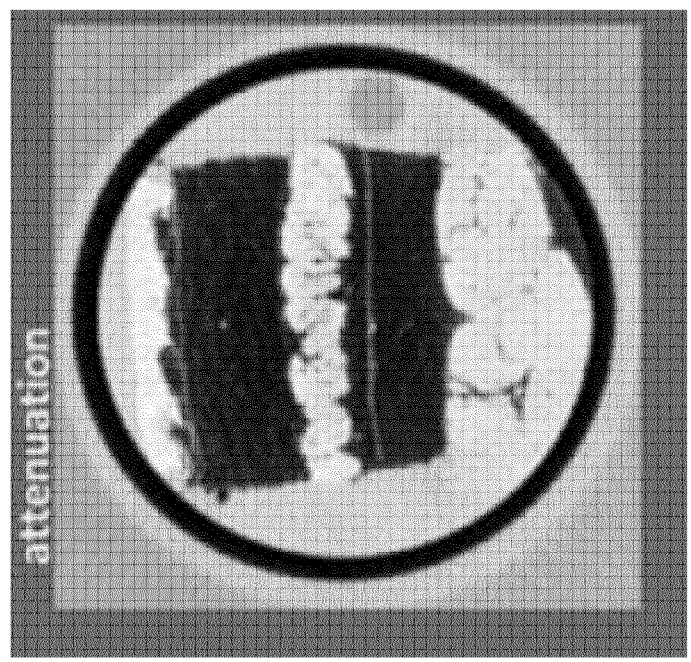
FIG. 4 shows an attenuation image recorded by phase-contrast imaging for explaining the present invention.

FIG. 4 shows an attenuation image recorded by phase-contrast imaging for explaining the present invention.

A common feature of dual-energy computed tomography, spectral computed tomography, and phase contrast computed tomography is that the system generates two or even more images of an object with different contrasts with perfect geometric alignment. FIG. 4 illustrates one type of two types of the images obtained by a phase contrast computed tomography system, demonstrating also the at least partially complementary contrasts in the two images. The so-called "attenuation image" is shown in FIG. 4.

FIG. 5 shows a phase image recorded by phase-contrast imaging for explaining the present invention. FIG. 5 shows a second type of the two types of the images obtained by a phase contrast computed tomography system. The so-called "phase image" is shown in FIG. 5.

Figure 8:
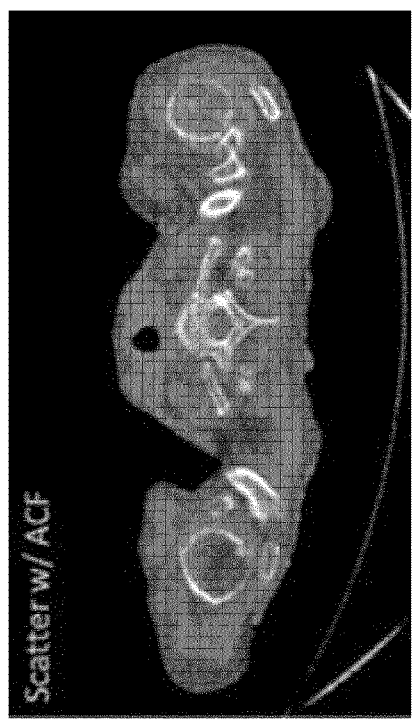
FIG. 8 shows a Compton-scatter image recorded by X-ray imaging for explaining the present invention.

FIG. 8 shows a Compton-scatter image recorded by X-ray imaging for explaining the present invention.

A common feature of dual-energy X-ray computed tomography and spectral X-ray computed tomography is that the system generates two images, for instance, the photo-electric and the Compton-scatter image or even more images, namely, some additional images with contrast agent only of an object. These images have different contrasts with perfect geometric alignment. FIG. 8 illustrates a first one of these two main categories, the so-called scatter Compton-image.

Figure 9:
FIG. 9 shows a photo-electric image recorded by X-ray imaging for explaining the present invention.

FIG. 9 shows a photo-electric image recorded by X-ray imaging for explaining the present invention.

FIG. 9 illustrates a second one of these two main categories, the so-called photo-electric image obtained by a dual layer X-ray computed tomography system. FIG. 9 and FIG. 8 may describe a supplementary or complementary images or methods for the present invention.

It has to be noted that embodiments of the present invention are described with reference to different subject-matters. In particular, some embodiments are described with reference to method type claims, whereas other embodiments are described with reference to the device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined providing synergetic effects that are more than the simple summation of these features.

While the invention has been illustrated and described in detail in the drawings and foregoing description, such illustration and description are to be considered illustrative or exemplary and not restrictive; the present invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be considered as limiting the scope.

The invention claimed is:

1. Device for iterative reconstruction of images recorded by at least two imaging methods, the device comprising:
    an extraction module, which is configured to extract a first set of patches from a first image recorded by a first imaging method and to extract a second set of patches from a second image recorded by a second imaging method;
    a generation module, which is configured to generate a set of reference patches based on a merging of a first limited number of atoms for the first set of patches and of a second limited number of atoms for the second set of patches; and
    a regularization module, which is configured to perform a joint regularization of the first image and the second image by means of the generated set of reference patches.

2. The device according to claim 1,
    wherein the extraction module is configured to extract the first set of patches from an attenuation image recorded as the first image and to extract the second set of patches from a phase image recorded as the second image.

3. The device according to claim 1,
    wherein the extraction module is configured to extract the first set of patches from a photo-electric image recorded as the first image and to extract the second set of patches from a Compton-scatter image recorded as the second image.

4. The device according to claim 1,
    wherein the generation module is configured to generate the reference patches based on a linear combination of atoms for the first set of patches and atoms for the second set of patches.

5. The device according to claim 1,
    wherein the generation module is configured to generate the set of reference patches based on an affine combination, a conical combination, or a convex combination of the first set of patches and the second set of patches.

6. The device according to claim 1,
    wherein the extraction module is configured to extract as the first set of patches 2×2 pixel patches or 4×4 pixel patches or 8×8 pixel patches or 16×16 pixel patches and to extract as the second set of patches 2×2 pixel patches or 4×4 pixel patches or 8×8 pixel patches or 16×16 pixel patches.

7. The device according to one claim 1,
    wherein the generation module is configured to generate the set of reference patches in form of a generic dictionary.

8. The device according to claim 7, wherein the generation module is configured to generate the generic dictionary comprising base functions of two-dimensional discrete transformation.

9. A medical imaging system comprising a device according to claim 1.

10. A method for iterative reconstruction of images recorded by at least two imaging methods, the method comprising the steps of:
    extracting a first set of patches from a first image recorded by a first imaging method and extracting a second set of patches from a second image recorded by a second imaging method by means of an extraction module;
    generating a set of reference patches based on a merging of a first limited number of atoms for the first set of patches and of a second limited number of atoms for the second set of patches by means of a generation module; and
    performing a joint regularization of the first image and the second image using the generated set of reference patches by means of a regularization module.

11. The method according to claim 10,
    wherein the step of Extracting is based on extracting the first set of patches from an attenuation image recorded as the first image and on extracting the second set of patches from a phase image recorded as the second image.

12. The method according to claim 10, wherein the step of Extracting is based on extracting the first set of patches from an transmission image recorded as the first image and on extracting the second set of patches from a Compton-scatter image recorded as the second image.

13. The method according to claim 10, further comprising the steps of:
    generating the set of reference patches based on a linear combination of the first limited number of atoms and the second limited number of atoms.

14. The method according to claim 10, further comprising the steps of:
    generating the set of reference patches based on an affine combination, a conical combination, or a convex combination of the first set of patches and the second set of patches.

15. Computer program comprising a program code for performing the method according to claim 10, when the computer programs runs on a computer.

* * * * *